US011159962B2

(12) United States Patent
Williams et al.

(10) Patent No.: US 11,159,962 B2
(45) Date of Patent: *Oct. 26, 2021

(54) OPTIMIZATION AND FAILURE DETECTION OF A WIRELESS BASE STATION NETWORK

(71) Applicant: TRAKPOINT SOLUTIONS, INC., San Diego, CA (US)

(72) Inventors: Christopher Williams, San Diego, CA (US); Jon Siann, San Diego, CA (US)

(73) Assignee: TRAKPOINT SOLUTIONS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,757

(22) Filed: Nov. 25, 2020

(65) Prior Publication Data
US 2021/0243616 A1 Aug. 5, 2021

Related U.S. Application Data

(63) Continuation-in-part of application No. 16/778,718, filed on Jan. 31, 2020, now Pat. No. 10,887,782.

(51) Int. Cl.
*H04W 24/02* (2009.01)
*H04B 17/318* (2015.01)
(Continued)

(52) U.S. Cl.
CPC .......... *H04W 24/02* (2013.01); *H04B 17/318* (2015.01); *H04W 24/04* (2013.01); *H04W 24/10* (2013.01)

(58) Field of Classification Search
CPC ..... H04W 24/04; H04W 24/02; H04W 24/10; H04B 17/318
See application file for complete search history.

(56) References Cited

U.S. PATENT DOCUMENTS

| 4,430,700 A | * | 2/1984 | Chadima, Jr. | ......... H04L 12/433 710/316 |
| 5,872,773 A | * | 2/1999 | Katzela | ................... H04L 45/10 370/256 |

(Continued)

OTHER PUBLICATIONS

Y. Lien, W. Sommool, J. Huang and H. Chang, "Design of Agency Communication for Contingency Cellular Network," 2018 Global Wireless Summit (GWS), 2018, pp. 124-129, (Year: 2018).*

*Primary Examiner* — Ayaz R Sheikh
*Assistant Examiner* — Tarell A Hampton
(74) *Attorney, Agent, or Firm* — Nguyen Tarbet LLC

(57) ABSTRACT

The present invention is directed to optimization and failure detection of a wireless base station network. Based on an RF link attenuation measurement, e.g., a Received Signal Strength Indication (RSSI) measurement, a server determines an optimal transmission sequence. For each base station of the optimal transmission sequence, a predecessor and a successor are designated. Each base station of the sequence generates a packet. The most distant base station (relative to the server) transmits its packet to its successor. Each base station of the sequence (in turn) receives the packet from its predecessor, combines the received packet with its own generated packet, transmits the combined packet to its successor, and so on until the combined packet is relayed to a super base station at the end of the sequence. The super base station transmits the packet to the server. Based on the packet size, the server can ascertain which base station (if any) failed.

36 Claims, 7 Drawing Sheets

(51) Int. Cl.
*H04W 24/10* (2009.01)
*H04W 24/04* (2009.01)

(56) References Cited

U.S. PATENT DOCUMENTS

| | | | | |
|---|---|---|---|---|
| 5,940,372 | A * | 8/1999 | Bertin | H04L 45/00 370/238 |
| 6,147,965 | A * | 11/2000 | Burns | H04Q 11/0478 370/216 |
| 6,807,165 | B2 * | 10/2004 | Belcea | H04W 48/08 370/347 |
| 9,419,854 | B1 * | 8/2016 | Wang | H04L 41/0654 |
| 10,887,782 | B1 | 1/2021 | Williams et al. | |
| 2002/0191573 | A1 * | 12/2002 | Whitehill | H04L 1/1887 370/338 |
| 2003/0219005 | A1 * | 11/2003 | Isnard | H04W 56/002 370/350 |
| 2004/0233855 | A1 * | 11/2004 | Gutierrez | H04L 45/00 370/252 |
| 2006/0256802 | A1 * | 11/2006 | Edwards | H04W 40/22 370/401 |
| 2007/0015528 | A1 * | 1/2007 | Nemethova | H04W 52/48 455/522 |
| 2007/0232310 | A1 * | 10/2007 | Schiff | H04W 52/46 455/436 |
| 2007/0237072 | A1 * | 10/2007 | Scholl | H04L 45/02 370/222 |
| 2008/0040628 | A1 * | 2/2008 | Mandal | H04L 43/103 714/4.1 |
| 2009/0239520 | A1 * | 9/2009 | Inagaki | H04W 88/08 455/422.1 |
| 2010/0223492 | A1 * | 9/2010 | Farrugia | H04L 65/1006 714/4.1 |
| 2011/0026434 | A1 * | 2/2011 | Van Der Stok | G01S 5/0289 370/254 |
| 2011/0223960 | A1 | 9/2011 | Chen et al. | |
| 2013/0217382 | A1 * | 8/2013 | Kudo | H04W 24/02 455/423 |
| 2014/0189443 | A1 * | 7/2014 | Xu | H04L 1/00 714/48 |
| 2014/0213279 | A1 * | 7/2014 | Hiltunen | G01S 1/024 455/456.1 |
| 2014/0281670 | A1 * | 9/2014 | Vasseur | H04L 45/28 714/4.11 |
| 2016/0309345 | A1 * | 10/2016 | Tehrani | H04W 72/0426 |
| 2016/0353363 | A1 * | 12/2016 | Yaginuma | H04W 64/003 |
| 2017/0064599 | A1 * | 3/2017 | Caine | H04W 52/0209 |
| 2017/0086082 | A1 | 3/2017 | Narayanan | |
| 2017/0347292 | A1 | 11/2017 | Ho et al. | |
| 2018/0124677 | A1 * | 5/2018 | He | H04W 72/085 |
| 2018/0270894 | A1 | 9/2018 | Park et al. | |

* cited by examiner

OPTIMIZATION AND FAILURE DETECTION OF A WIRELESS BASE STATION NETWORK

CROSS-REFERENCES TO RELATED APPLICATIONS

This application is a continuation-in-part and claims benefit of U.S. patent application Ser. No. 16/778,718, filed Jan. 31, 2020, the specification of which is incorporated herein in its entirety by reference.

FIELD OF THE INVENTION

The present invention generally relates to determining the optimal transmission sequence (i.e., a subnetwork of base stations) in a larger network of base stations and detection of the failure of a base station in that sequence.

BACKGROUND OF THE INVENTION

For energy-constrained networks of battery-powered devices, the energy-efficiency of multi-hop routing is a critical design objective. Though the existing algorithms for a routing protocol are adequate for networks that operate under tight-but-typical, low-power energy constraints, these algorithms are inadequate for applications where the nodes must communicate with a cloud server indirectly by relaying data through a transmission chain with a systemic energy budget that is unusually low.

For example, in typical methods known in the art, each node of the network stores the complete routing information of the entire network. While this design makes the determination of the transmission route very fast, every node of the entire network must update its routing table (and therefore consume energy) whenever the network topology changes. Other methods either require a single node to flood the entire network with route request messages or require several nodes to broadcast packets just to determine the transmission route. Thus, a particular need exists specifically for a multi-hop routing scheme with premium energy-efficiency.

SUMMARY OF THE INVENTION

The present invention is directed to the optimization and failure detection of a wireless base station network. Each base station (of a plurality of base stations) may receive an RF link attenuation measurement, e.g., by performing a received signal strength indication (RSSI). The server may generate a matrix of base stations and super base stations that were detected by the RF link attenuation measurement, e.g., the RSSI. When initializing the network, each base station may transmit a serial number to the server.

The server may determine (based on the RF link attenuation measurement, e.g., the RSSIs) an optimal transmission sequence of base stations from a most distant base station to a super base station. The network topology of the optimal transmission sequence may be a linear daisy chain. Since the server determines the optimal transmission sequence, base stations conserve the power that would otherwise be needed to transmit or broadcast packets to discover the route. The super base station may wait for the command of the server to designate a predecessor and a successor for each base station of the optimal transmission sequence. Contrary to methods known in the art, each base station saves energy by being oblivious of the total optimal transmission sequence (and even the total plurality of base stations) and only aware of the base station that precedes it and follows it in the optimal transmission sequence.

Each base station of the optimal transmission sequence may generate a packet. The most distant base station of the optimal transmission sequence may transmit its packet to the next base station. A base station may transmit the packet without identifying the source in order to conserve power. The next base station may receive the packet, may combine the received packet with its own packet, and may transmit the aggregate packet to the next base station, and so on until the packet may be received by the super base station. If a certain amount of time has lapsed without receiving the aggregate packet, a base station may carry on and transmit the packet that it generated without combining it with the aggregate packet. Once a packet has been received by the transmitting base station's successor, the packet may be cleared from the transmitting base station's memory.

The super base station may transmit the aggregate packet to the server. The server may determine how many base stations successfully transmitted based on the size of the aggregate packet. The server may determine which base station in the optimal transmission sequence failed using Sequential Interruption Logic.

As used herein, the term "Sequential Interruption Logic" refers to the determination of which base station failed in a linear daisy chain if each base station may only transmit in sequential order. Sequential Interruption Logic reasons that a failed base station will prevent the transmission of the aggregated packets of all the base stations that precede it in the optimal transmission sequence. Consequently, if the aggregate packet is missing multiple contributions from respective base stations, then the failed base station must be the sequentially latest base station of the base stations from which contributions are missing.

Thus, to detect and resolve failure in a network where the base stations do not communicate directly with the server, the failure of a base station is inferred from the size of the aggregate packet that is ultimately received by the server. The server calculates how many contributions are missing from the aggregate packet and determines which base station must have failed (since the base stations must transmit in sequence). This inference obviates the need to communicate with the base stations to ascertain which base station 601 failed (a system design that further minimizes energy consumption).

One of the many inventive technical features of the present invention is the generation of an optimal transmission path in the form of a linear daisy chain. Without wishing to limit the invention to any theory or mechanism, it is believed that the technical feature of the present invention advantageously provides for a decrease in overall energy consumption in a wireless base station network due to the removal of the need for base stations to store information on the entire network and the fact that a base station only needs to communicate with two stations: a predecessor and a successor. None of the presently known prior references or work has the unique inventive technical feature of the present invention.

Furthermore, the generation of an optimal transmission path in the form of a linear daisy chain is counterintuitive. The reason that it is counterintuitive is because one skilled in the art would normally seek a straight line as the most efficient route. That is, a series of base stations installed in a straight line would communicate with the super base station mounted in the same manner. One skilled in the art would expect the straight-line topology to carry transmissions more efficiently and that the construction of the optimal transmission path in the server would be more time and energy efficient. Thus, the linear daisy chain transmission path is counterintuitive. Surprisingly, the straight-line transmission path encounters issues with data transmission reliability, leading to excessive power consumption over repeated attempts at data transmission and failure to transmit data in such a way as to avoid retries. The linear-daisy chain transmission path rectifies this issue by finding the path with the most efficiency and reliability. Additionally, the straight-line transmission path is hindered by areas where radio signals cannot penetrate well or even penetrate at all, while the linear daisy chain transmission path allows for data transmission around these areas without requiring human intervention as the former method would.

Another inventive technical feature of the present invention is the storage of one packet in memory of a base station, the deletion of the packet from the memory only when the packet has been received by a successive base station, and the recursive transmission of packets until the memory of every base station is empty. Without wishing to limit the invention to any theory or mechanism, it is believed that the technical feature of the present invention advantageously provides for a decrease in the energy consumption of each individual base station since only one packet needs to be held in the base station memory at a time, and it is deleted when it is no longer necessary. Furthermore, the recursive transmission of packets until the memory of every base station is empty is a time and energy efficient method of repeating transmissions until the packet is sent to the server correctly since it does not require communication between a base station and anyone other than its predecessor and successor. None of the presently known prior references or work has the unique inventive technical feature of the present invention.

Furthermore, the storage of one packet in memory of a base station, the deletion of the packet from the memory only when the packet has been received by a successive base station, and the recursive transmission of packets until the memory of each base station is empty are all counterintuitive. The reason that it is counterintuitive is because one skilled in the art would expect that the deletion of a packet after transmission in a system would consume more energy than simply storing packets for a longer period of time in repeated transmission sequences since the same packet would have to be generated repeatedly until all base stations were functional. Thus, it would be counterintuitive to store only one packet, delete it after transmission, and recursively transmit until the memory of every base station is cleared. Surprisingly, storing only one packet and deleting it from memory is more energy efficient than storing data for a longer period of time, even in repeated transmission sequences.

Another inventive technical feature of the use of Sequential Interruption Logic in a server for failure detection. Without wishing to limit the invention to any theory or mechanism, it is believed that the technical feature of the present invention advantageously provides for a decrease in overall energy consumption since the server does not need to communicate with any base stations in order to determine which base station was unresponsive. None of the presently known prior references or work has the unique inventive technical feature of the present invention.

Furthermore, the use of Sequential Interruption Logic in a server for failure detection is counterintuitive. The reason that it is counterintuitive is because one skilled in the art would expect that the internal logic required in the server for this method would reduce time efficiency and potentially accuracy to the point of outweighing the energy savings gained by removing communication between the server and base stations. Thus, the use of Sequential Interruption Logic for failure detection is counterintuitive. Surprisingly, Sequential Interruption Logic is comparable in time efficiency and accuracy to prior methods of failure detection while decreasing energy consumption.

BRIEF DESCRIPTION OF THE DRAWINGS

The features and advantages of the present invention will become apparent from a consideration of the following detailed description presented in connection with the accompanying drawings in which.

DETAILED DESCRIPTION OF EXEMPLARY EMBODIMENTS

When used herein, terms describing order and position (such as, but not limited to, "predecessor," "successor," "next", "prior" and "previous") are not limiting upon the claims unless expressly recited therein. It will be appreciated that the terms "predecessor" and "successor" are used to mean the preceding (or previous) base station 601 and the succeeding (or next) base station 601, respectively. However, when these terms are used herein to identify a base station 601, these terms identify a base station 601 that is relative to the most recent iteration of a recursive loop. Thus, each iteration of the recursion causes a reassessment or relabeling of the described elements. For example, if one iteration of the loop defines a "base station 601" and "its successor," then in the next iteration of the loop, the base station 601 is actually the successor from the previous iteration and the meaning of "its successor" (in the second iteration) actually refers to the successor of the successor of the base station 601 from the first iteration. Thus, when identifying a base station 601, these relative adjectives relate back through each of the previous loop iterations all the way to the very first iteration. Consequently, the claim element identified by the terms "base station 601," "predecessor," and "successor" depends on the iteration of the loop. Restated, the terms "predecessor" and "successor" only relatively label the claim elements, and the claim element objectively identified by the label must be ascertained through compound application of the recursion.

The figures presented in this patent application (including the angles, proportions of dimensions, etc.) are representative only and the claims are not limited by the dimensions of the figures.

Figure 1:
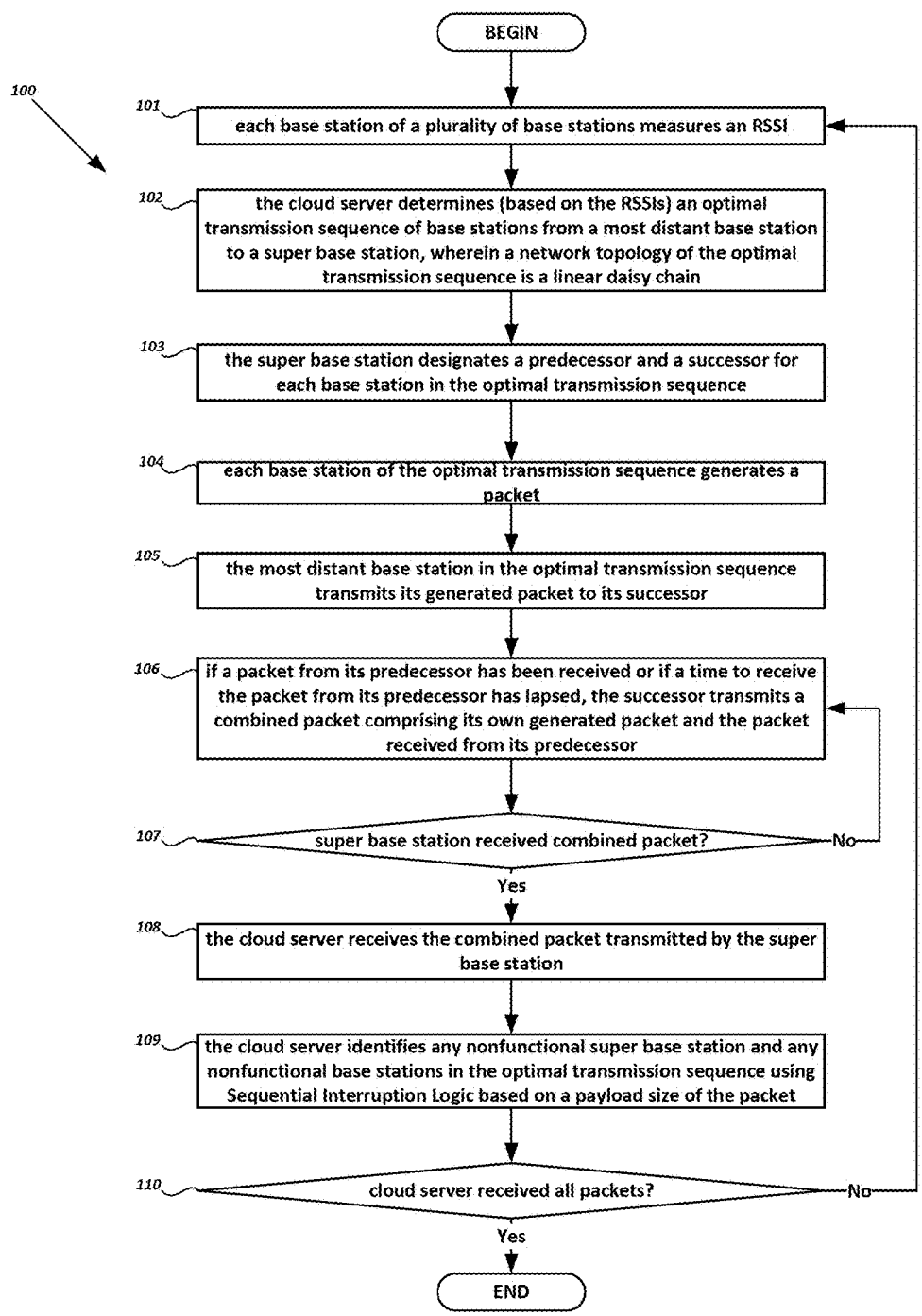
FIG. 1 is a flow chart of the method of claim 1 for optimization and failure detection of an exemplary wireless base station network, such as (by way of non-limiting example) a Bluetooth Low Energy indoor localization system. The wireless base station network may comprise a cloud server, at least one super base station and a plurality of base stations associated with the respective super base station. Each super base station may comprise, for example, an ultra-wideband antenna for set-up & maintenance and a low-power, wide-area network (LPWAN, e.g., LoRa) antenna for data. Each base station may comprise, for example, an ultra-wideband antenna for set-up & maintenance and an LPWAN (e.g., LoRa) antenna for data. Each base station may comprise memory for temporary storage of packets.

Referring to FIG. 1, the present invention features a method 100 for optimization and failure detection of a wireless base station 601 network. In some embodiments, the method comprises each base station 601 of zero, one or a plurality of base stations measuring 101 a RF link attenuation measurement. In some embodiments, the RF link attenuation measurement is a received signal strength indicator (RSSI). If the network is being initialized (such as, for example, upon deployment for the first time), each base station 601 of the zero, one or plurality of base stations may transmit a serial number to the server 603. Based on the RF link attenuation measurements, the server 603 may determine 102 an optimal transmission sequence of base stations from a most distant base station 601 to a super base station 602 in the form of a linear daisy chain. The super base station 602 may designate 103 a predecessor and a successor for each base station 601 in the optimal transmission sequence.

In some embodiments, each base station 601 of the optimal transmission sequence may generate 104 a packet. The most distant base station 601 of the optimal transmission sequence may transmit 105 its generated packet to its successor, the successor may transmit 106 to its respective successor a combined packet comprising its own generated packet and the packet received from its predecessor, and so on, until the super base station 602 receives 107 the combined packet. In other embodiments, once a time to receive a packet from its predecessor has lapsed, a base station 601 may transmit 106 its generated packet to its successor. Following this, the successor may transmit 106 to its respective successor a combined packet comprising its own generated packet and the packet received from its predecessor, and so on, until the super base station 602 receives 107 the combined packet. In some embodiments, a base station 601 may transmit the packet without identifying the transmission source in order to conserve power.

In some embodiments, the server 603 may receive 108 the combined packet transmitted by the super base station 602. The server 603 may identify 109 any nonfunctional super base station 602 and/or any nonfunctional base stations in the optimal transmission sequence using Sequential Interruption Logic based on a payload size of the packet. In some embodiments, the server 603 may optimize the network repeatedly 110 until all packets have been received.

In some embodiments, the antenna 721 of the super base station 602 may comprise an ultra-wideband antenna 722 for set-up & maintenance and an low-power wide-area network (LPWAN) antenna 723 for data. In some embodiments, the antenna 711 of the base station 601 may comprise an ultra-wideband antenna 712 for set-up & maintenance and an LPWAN antenna 713 for data. The server 603 may be a local server or a cloud server.

Figure 2:
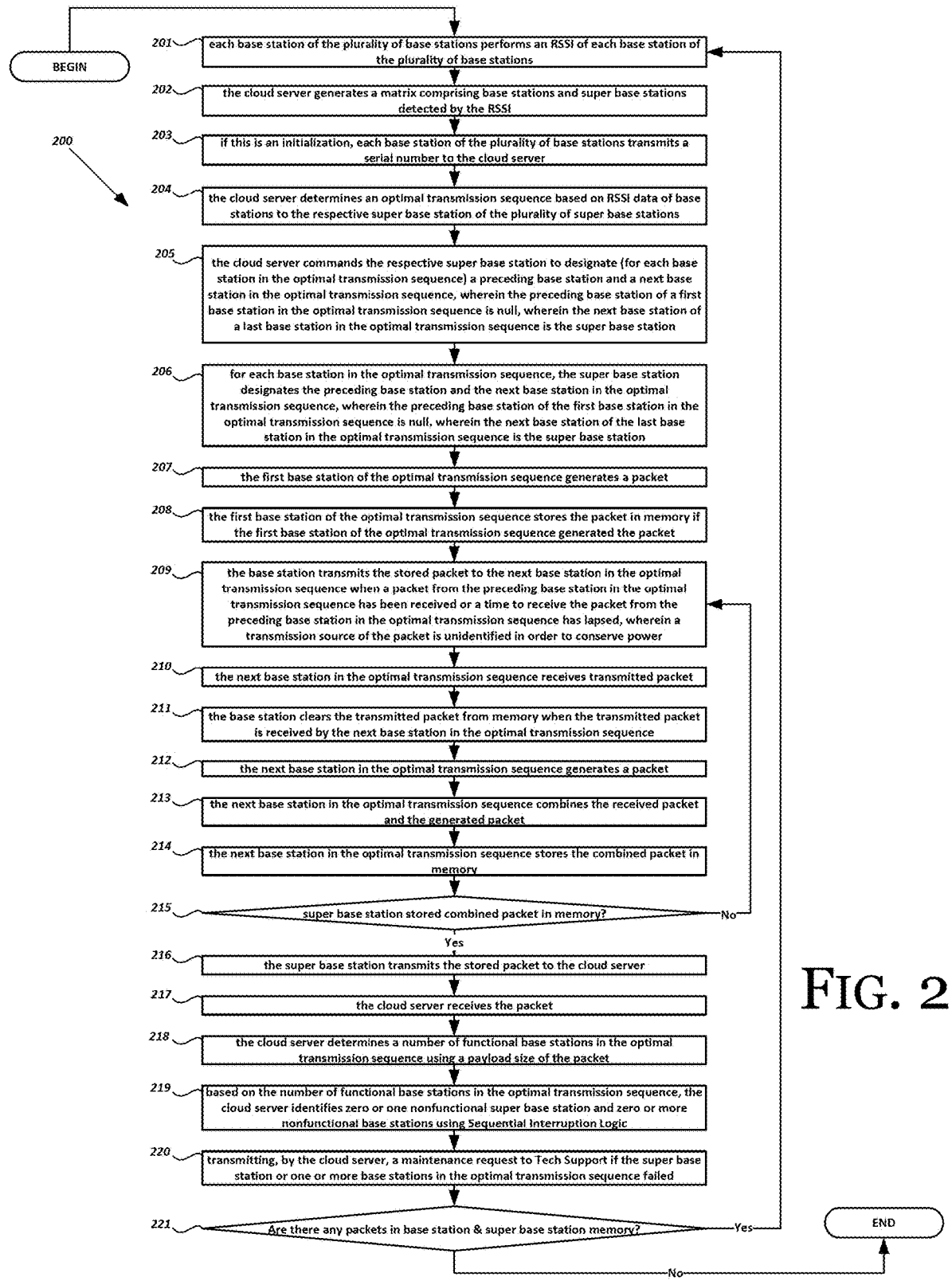
FIG. 2 is a flow chart of a method for optimization and failure detection of a wireless base station network in which supportive steps have been added to elaborate upon peripheral features of the present invention.

Referring now to FIG. 2, the present invention features a method 200 for optimization and failure detection of a wireless base station 601 network. In some embodiments, the wireless base station 601 network may comprise a server 603, a plurality of super base stations, and a plurality of base stations. Each super base station 602 of the plurality of super base stations may comprise a first processor 1007 capable of executing computer-executable instructions, a first randomly accessed memory (RAM) device 1008, a first memory device 1009, and a first antenna 721. Each base station 601 of the zero, one or plurality of base stations may comprise a second processor 1004 capable of executing computer-executable instructions, a second RAM device 1005, a second memory device 1006, and a second antenna 711. In some embodiments, the method may comprise each base station 601 of the zero, one or plurality of base stations performing 201 a RF link attenuation measurement of each base station 601 of the zero, one or plurality of base stations. The server 603 may generate 202 a matrix comprising base stations and super base stations detected by the RF link attenuation measurement. In some embodiments, if this optimization is also an initialization, each base station 601 of the zero, one or plurality of base stations may transmit 203 a serial number to the server 603. In some embodiments, the RF link attenuation measurement is a received signal strength indicator (RSSI).

In some embodiments, the server 603 may determine 204 an optimal transmission sequence based on RF link attenuation measurement data of base stations to the respective super base station 602 of the plurality of super base stations in the form of a linear daisy chain. The server 603 may command 205 the respective super base station 602 to designate a predecessor in the optimal transmission sequence and a successor in the optimal transmission sequence for each base station 601 in the optimal transmission sequence. The super base station 602 may designate 206 the predecessor in the optimal transmission sequence and the successor in the optimal transmission sequence for each base station 601 in the optimal transmission sequence. The predecessor in the optimal transmission sequence of a first base station 601 in the optimal transmission sequence may be null, and the successor in the optimal transmission sequence of a last base station 601 in the optimal transmission sequence may be the super base station 602.

In some embodiments, the first base station 601 of the optimal transmission sequence may generate 207 a packet at a scheduled time. If the first base station 601 of the optimal transmission sequence generated the packet, the first base station 601 of the optimal transmission sequence may store 208 the packet in memory. When the packet from the predecessor in the optimal transmission sequence has been received or a time to receive the packet from the predecessor in the optimal transmission sequence has lapsed, the base station 601 may transmit 209 the stored packet to the successor in the optimal transmission sequence. In some embodiments, the base may transmit a packet without identifying the transmission source of the packet in order to conserve power. The successor in the optimal transmission sequence may receive 210 the transmitted packet and the base station 601 may clear 211 the transmitted packet from memory when the transmitted packet is received by the successor in the optimal transmission sequence. The successor in the optimal transmission sequence may generate 212 the packet. In some embodiments, the successor in the optimal transmission sequence may combine 213 the received packet and the generated packet. The successor in the optimal transmission sequence may store 214 the combined packet in memory. In turn, each base station 601 of the optimal transmission sequence may receive a packet from its predecessor, combine the packet with its own packet, and transmit the combined packet to its successor until 215 the super base station 602 stores the combined packet in memory.

In some embodiments, the super base station 602 may transmit 216 the stored packet to the server 603. The server 603 may receive 217 the packet. The server 603 may determine 218 a number of functional base stations in the optimal transmission sequence using a payload size of the packet. The server 603 may identify 219 zero or one nonfunctional super base station 602 and zero or more nonfunctional base stations in the optimal transmission sequence using Sequential Interruption Logic based on the number of functional base stations in the optimal transmission sequence. If the super base station 602 or one or more base stations in the optimal transmission sequence failed, the server 603 may transmit 220 a maintenance request to Tech Support and the network of base stations may be optimized repeatedly 221 until the memory of each base station 601 of the zero, one or plurality of base stations and the memory of the super base station 602 are empty of packets.

In some embodiments, the antenna 721 of the super base station 602 may comprise an ultra-wideband antenna 722 for set-up & maintenance and an LPWAN antenna 723 for data. In some embodiments, the antenna 711 of the base station 601 may comprise an ultra-wideband antenna 712 for set-up & maintenance and an LPWAN antenna 713 for data. The server 603 may be a local server or a cloud server.

Figure 3:
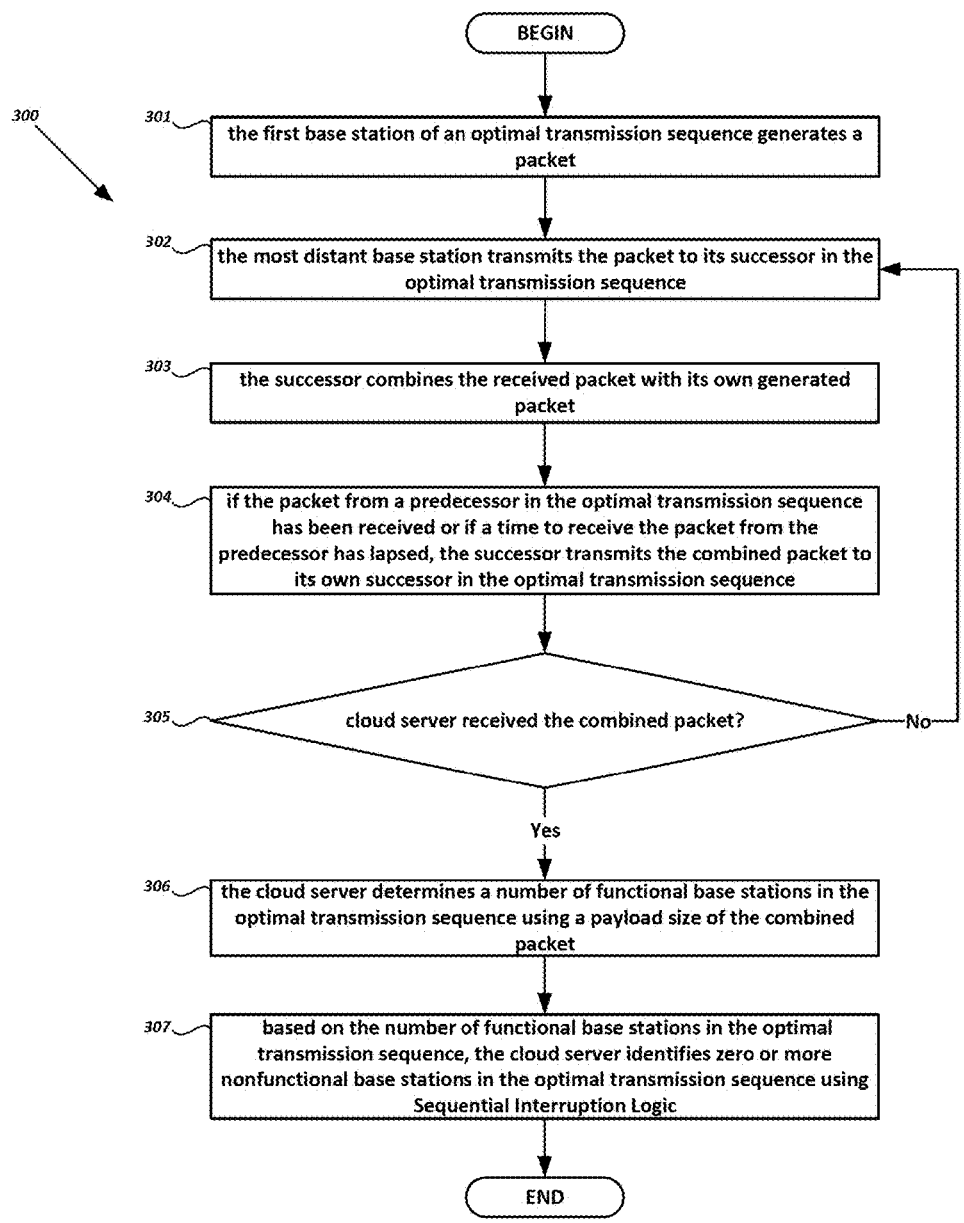
FIG. 3 is a flow chart of the method of claim 7 for failure detection of an optimal transmission sequence of base stations. Particular emphasis is placed upon the failure detection to underscore the energy-efficiency of the cloud server inferring the failure of a base station through Sequential Interruption Logic rather than by querying the base station (which would require the base station to waste power by transmitting a response).
Figure 4:
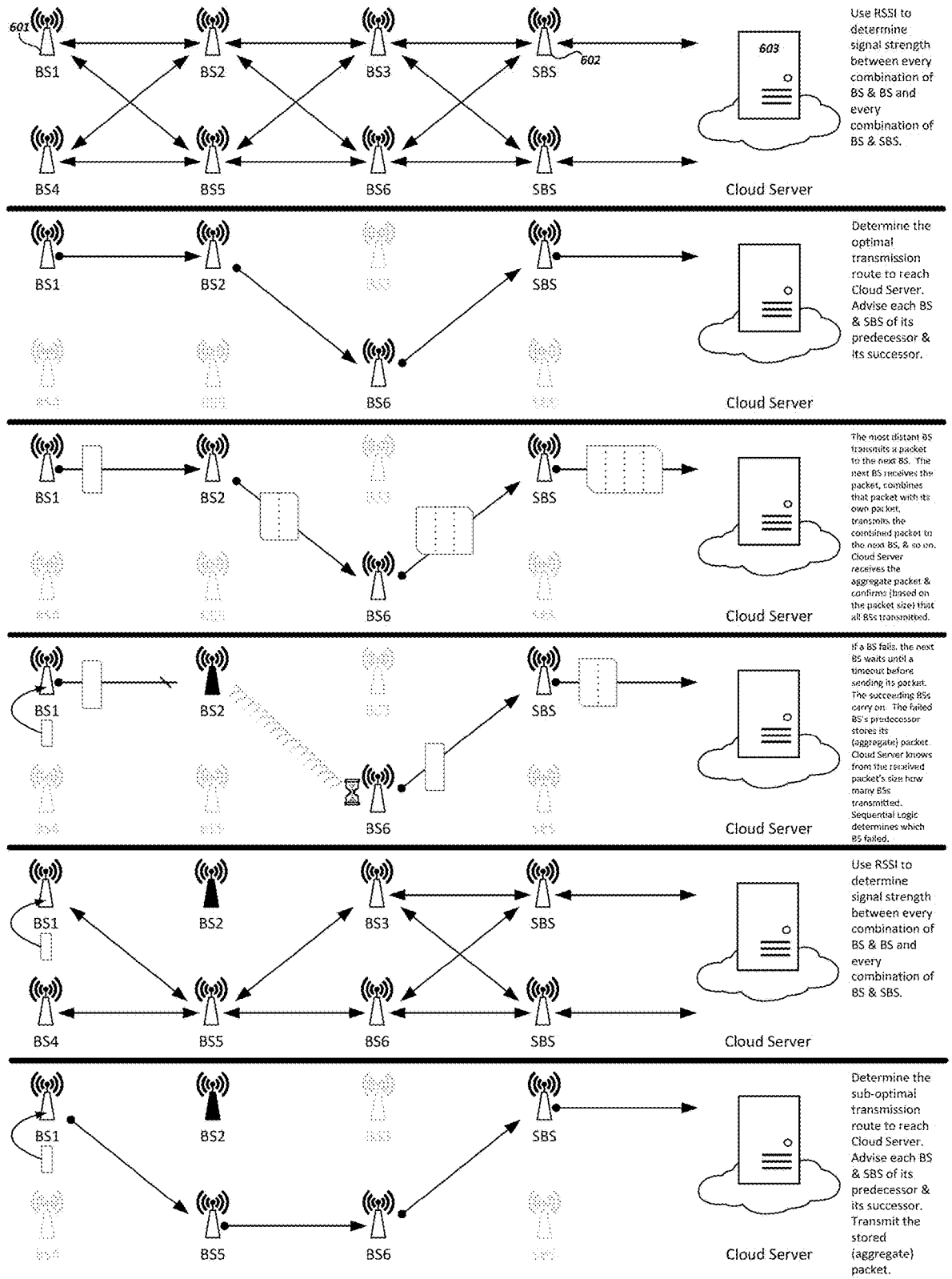
FIG. 4 is a diagram showing an exemplary response protocol for a hypothetical failure of a base station.
Figure 5:
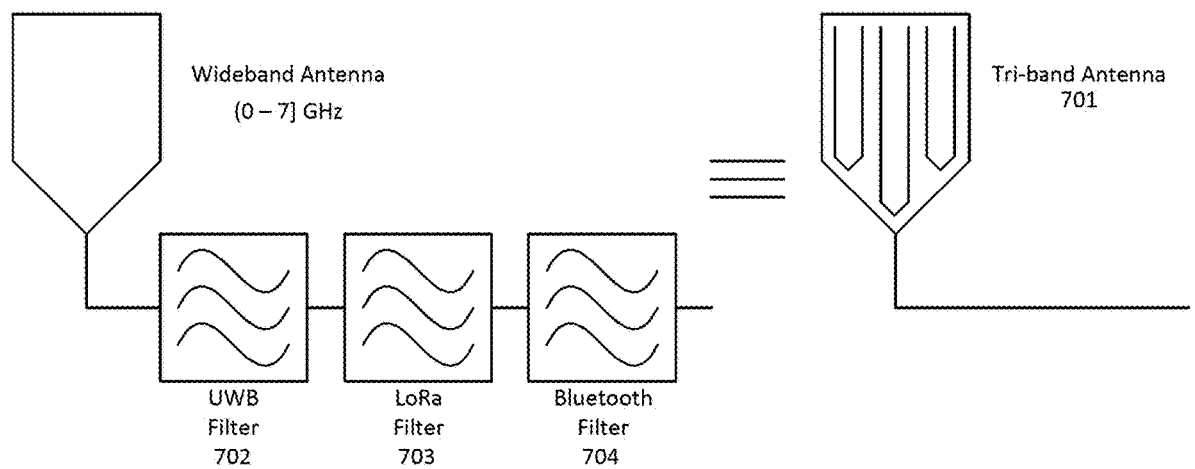
FIG. 5 is a diagram of an exemplary implementation of a tri-band antenna. The antenna may be, for example, a monopole or multipole or an antenna array of a plurality of monopoles and/or multipoles. The antenna may be configured with a wide bandwidth. The signal received by the antenna may be processed by, for example, a Bluetooth filter, an LPWAN (e.g., LoRa) filter, and an ultra-wideband filter such that the filters effectively configure a single, wideband antenna to function as a tri-band antenna.
Figure 5:
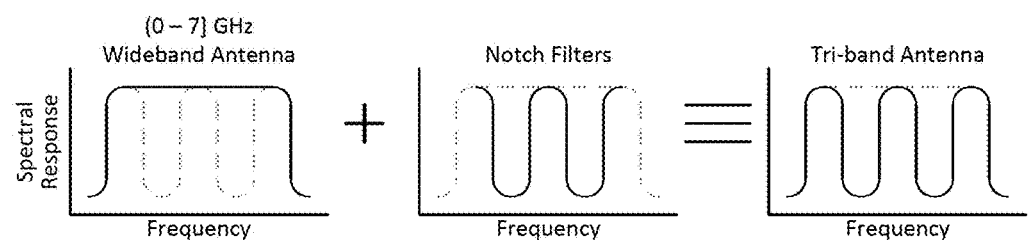

Referring now to FIG. 3, the present invention features a method 300 for failure detection of a wireless base station 601 in an optimal transmission sequence. In some embodiments, a network topography of the optimal transmission sequence may be a linear daisy chain. A successor of a last base station 601 in the optimal transmission sequence may be a server 603. The method may comprise each base station 601 of the optimal transmission sequence generating 301 a packet. The most distant base station 601 of the optimal transmission sequence may transmit 302 the packet to its successor in the optimal transmission sequence, and the successor may combine 303 the received packet with its own generated packet. The successor may transmit 304 the combined packet to its own successor in the optimal transmission sequence if the packet from a predecessor in the optimal transmission sequence has been received or when a time to receive the packet from the predecessor has lapsed. In turn, a successor in the optimal transmission sequence may receive the combined packet from its predecessor, combine the received packet with its own generated packet, and transmit the combined packet to its own successor until the server 603 receives the combined packet.

In some embodiments, the server 603 may determine 306 a number of functional base stations in the optimal transmission sequence using a payload size of the combined packet. The server 603 may identify 307 zero or more nonfunctional base stations in the optimal transmission sequence using Sequential Interruption Logic based on the number of functional base stations in the optimal transmission sequence.

In some embodiments, the antenna 721 of the super base station 602 may comprise an ultra-wideband antenna 722 for set-up & maintenance and an LPWAN antenna 723 for data. In some embodiments, the antenna 711 of the base station 601 may comprise an ultra-wideband antenna 712 for set-up & maintenance and an LPWAN antenna 713 for data.

A server 603 may comprise at least one of network computing environments known in the art with computer system configurations further comprising personal computers, desktop computers, laptop computers, rack computers, mainframes and the like. The network computing environment may comprise at least a process for executing instructions, RAM, memory upon which is stored instructions executable by the processor. The server 603 may also be implemented in distributed system environments where operations are delegated to and/or shared between local and remote computer systems across a network. In a distributed system environment, program modules may be located in both local and remote memory storage devices. The server 603 may be a local server or a cloud server.

A base station 601 may be (by way of non-limiting example) any wireless device, comprising a processor 1004 for executing instructions, RAM 1005, memory 1006 upon which is stored instructions executable by the processor, and an antenna 711. A super base station 602 may be (by way of non-limiting example) any wireless device, comprising a processor 1007 for executing instructions, RAM 1008, memory 1009 upon which is stored instructions executable by the processor, and an antenna 721. Those skilled in the art will appreciate that a wireless device may include personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, access points, transceivers, and the like.

An antenna 701 may be a wideband antenna configured with a bandwidth greater than 0 GHz and less than or equal to 7 GHz. The wideband antenna 701 may be configured with filters to distinguish multiple bands of radiofrequencies. The bands of radiofrequencies may include non-limiting examples such as ultra-wideband (UWB) 702, an LPWAN (such as LoRa) 703, and Bluetooth 704. Ultra-wideband 702 may comprise frequencies exceeding the lesser of 500 MHz or 20% of the arithmetic center frequency. The LPWAN 703 may comprise 433 MHz, 868 MHz, and 915 MHz frequencies. Bluetooth 704 may comprise frequencies ranging from 2.400 GHz-2.4835 GHz (including guard bands).

Instructions that cause at least one processing circuit to perform one or more operations are "computer-executable." Within the scope of the present invention, "computer-readable memory," "computer-readable storage media," and the like comprises two distinctly different kinds of computer-readable media: physical storage media that stores computer-executable instructions and transmission media that carries computer-executable instructions. Physical storage media includes RAM and other volatile types of memory; ROM, EEPROM and other non-volatile types of memory; CD-ROM, CD-RW, DVD-ROM, DVD-RW and other optical disk storage; magnetic disk storage or other magnetic storage devices; and any other tangible medium that can store computer-executable instructions that can be accessed and processed by at least one processing circuit. Transmission media can include signals carrying computer-executable instructions over a network to be received by a general-purpose or special-purpose computer. Thus, it is emphasized that (by disclosure or recitation of the exemplary term "non-transitory") embodiments of the present invention expressly exclude signals carrying computer-executable instructions.

However, it should be understood that once a signal carrying computer-executable instructions is received by a computer, the type of computer-readable storage media transforms automatically from transmission media to physical storage media. This transformation may even occur early on in intermediate memory such as (by way of example and not limitation) a buffer in the RAM of a network interface card, regardless of whether the buffer's content is later transferred to less volatile RAM in the computer. Thus, devices that merely repeat a signal are contemplated by the embodiments of the present invention, even though the media that carry the signal between such devices and the signal itself are expressly not included within the claim scope. Thus, it should be understood that "non-transitory computer-readable storage media" may be used herein instead of simply "physical storage media" or "physical computer-readable storage media" in order to underscore that even transmission media necessarily involves eventual transformation into physical storage media and to therefore capture all embodiments where the computer-readable instructions are stored in physical storage media—even if only temporarily before transforming back into transmission media.

In some embodiments, when executed by the processor of the server 603, the instructions may cause the processor to perform operations. The operations may comprise determining based on a plurality of RF link attenuation measurements an optimal transmission sequence of base stations from a most distant base station 601 to a super base station 602, wherein a network topology of the optimal transmission sequence is a linear daisy chain; receiving the combined packet transmitted by the super base station 602; identifying any nonfunctional super base station 602 and any nonfunctional base stations 601 in the optimal transmission sequence using Sequential Interruption Logic based on a payload size of the packet; and receiving a packet. In some embodiments, the RF link attenuation measurement may be an RSSI.

In other embodiments, when executed by the processor of the server 603, the instructions may cause the processor to perform operations. The operations may comprise receiving the combined packet; determining a number of functional base stations in the optimal transmission sequence using a payload size of the combined packet; and identifying zero or more nonfunctional base stations in the optimal transmission sequence using Sequential Interruption Logic based on the number of functional base stations in the optimal transmission sequence.

In some embodiments, when executed by the processor of a base station 601, the instructions may cause the processor to perform operations. The operations may comprise measuring the RF link attenuation measurement; generating a packet; transmitting its generated packet to its successor; and transmitting, if a packet from its predecessor has been received or when a time to receive the packet from its predecessor has lapsed, a combined packet comprising its own generated packet and the packet received from its predecessor.

In other embodiments, when executed by the processor of a base station 601, the instructions may cause the processor to perform operations. The operations may comprise generating a packet; transmitting the packet to its successor in the optimal transmission sequence; combining the received packet with its own generated packet; and transmitting the combined packet to its own successor in the optimal transmission sequence if the packet from a predecessor in the optimal transmission sequence has been received or when a time to receive the packet from the predecessor has lapsed.

In some embodiments, when executed by the processor of a super base station 601, the instructions may cause the processor to perform operations. The operations may comprise designating a predecessor and a successor for each base station 601 in the optimal transmission sequence; receiving the combined packet; and transmitting the combined packet to the server 603.

Figure 6:
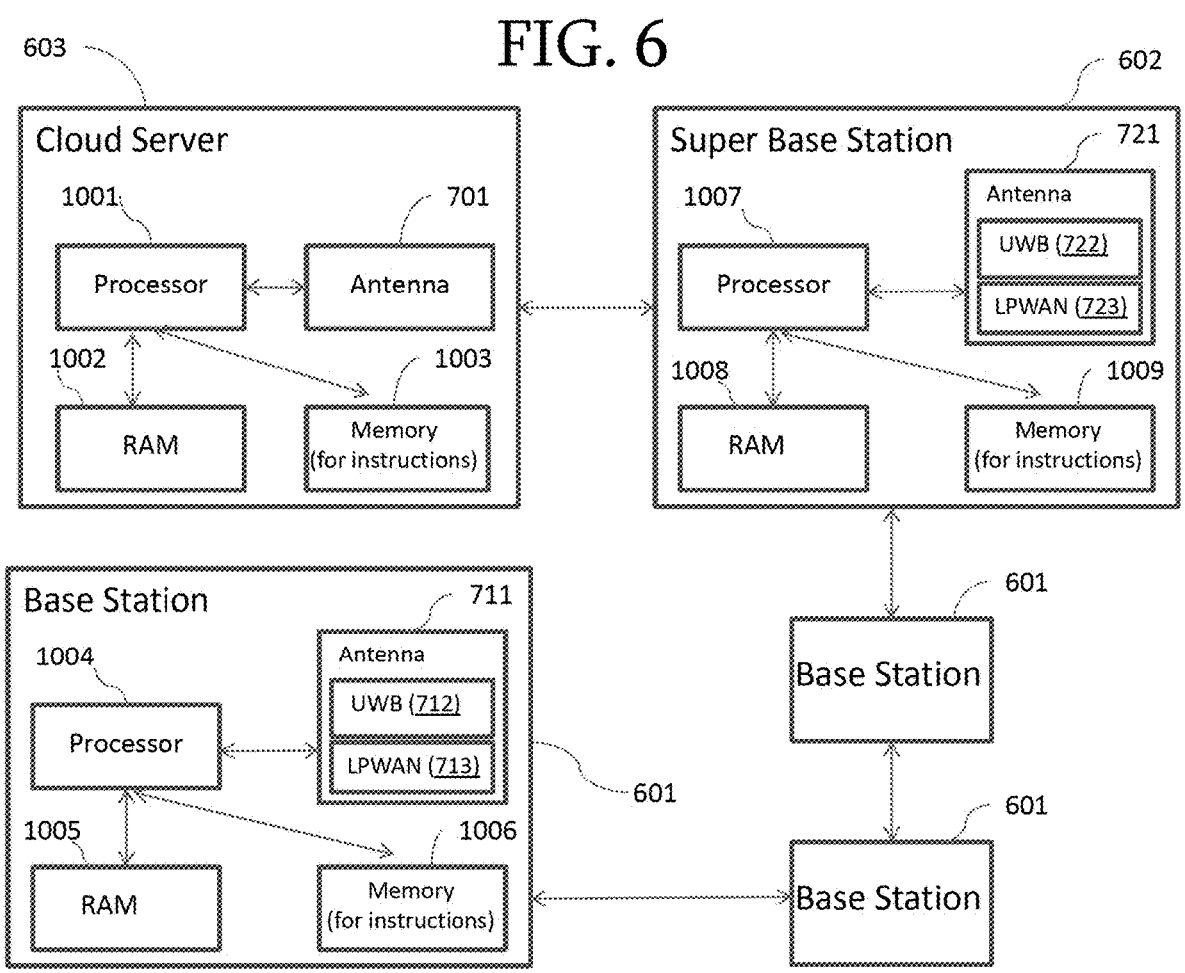
FIG. 6 is a diagram of the system of claim 11 for optimization and failure detection of a network of base stations. The components of a cloud server are shown, comprising a processor, an antenna, a randomly-accessed memory (RAM) component, and a memory component. The components of a base station are shown, comprising a processor, an antenna, a RAM component, and a memory component. The components of the antenna in the base station are shown, comprising an ultra-wideband antenna and an LPWAN antenna. The components of a super base station are shown, comprising a processor, an antenna, a RAM component, and a memory component. The components of the antenna in the super base station are shown, comprising an ultra-wideband antenna and an LPWAN antenna. Multiple base station nodes are shown to express the plurality of base stations in an optimal transmission sequence.

Referring to FIG. 6, the present invention features a system for optimization and failure detection of a network of base stations. In some embodiments, the system may comprise a server 603 that has a first processor 1001 capable of executing computer-executable instructions, a first antenna 701, a first RAM component 1002, and a first memory component 1003. The memory may comprise instructions for determining 102 based on a plurality of RF link attenuation measurements an optimal transmission sequence of base stations from a most distant base station 601 to a super base station 602. A network topology of the optimal transmission sequence may be a linear daisy chain. Other instructions include receiving 108 the combined packet transmitted by the super base station 602, identifying 109 any nonfunctional super base station 602 and any nonfunctional base stations in the optimal transmission sequence using Sequential Interruption Logic based on a payload size of the packet, and receiving 110 a packet. In some embodiments, the RF link attenuation measurement may be an RSSI.

In some embodiments, the system also may comprise a plurality of base stations. Each base station 601 of the zero, one or plurality of base stations may have a second processor 1004 capable of executing computer-executable instructions, a second antenna 711, a second RAM component 1005, and a second memory component 1006. The memory may comprise instructions for measuring 101 a RF link attenuation measurement, generating 104 a packet, transmitting 105 its generated packet to its successor, and transmitting 106, if a packet from its predecessor has been received or when a time to receive the packet from its predecessor has lapsed, a combined packet comprising its own generated packet and the packet received from its predecessor. It may also comprise instructions to repeat 107 packet combination and transmission to the successor recursively until the super base station 602 receives the combined packet. Each base station 601 in the zero, one or plurality of base stations may transmit a serial number to the server 603 only when initializing. In some embodiments, the RF link attenuation measurement may be an RSSI.

In some embodiments, the system may also comprise a plurality of super base stations. Each super base station 602 of the plurality of super base stations may comprise a third processor 1007 capable of executing computer-executable instructions, a third antenna 721, a third RAM component 1008, and a third memory component 1009. The memory may comprise instructions for designating 103 a predecessor and a successor for each base station 601 in the optimal transmission sequence, receiving 107 the combined packet, and transmitting 108 the combined packet to the server (603).

In some embodiments, a network topography of the optimal transmission sequence generated by the server 603 may be a linear daisy chain and a transmission source of the packet may be unidentified in order to conserve power.

In some embodiments, the antenna 721 of a super base station 602 in the plurality of super base stations may further comprise an ultra-wideband antenna 722 for set-up & maintenance and an LPWAN antenna 723 for data. The antenna 711 of a base station 601 in the plurality of base stations may further comprise an ultra-wideband antenna 712 for set-up & maintenance and an LPWAN antenna 713 for data. The server 603 may be a local server or a cloud server.

Figure 7:
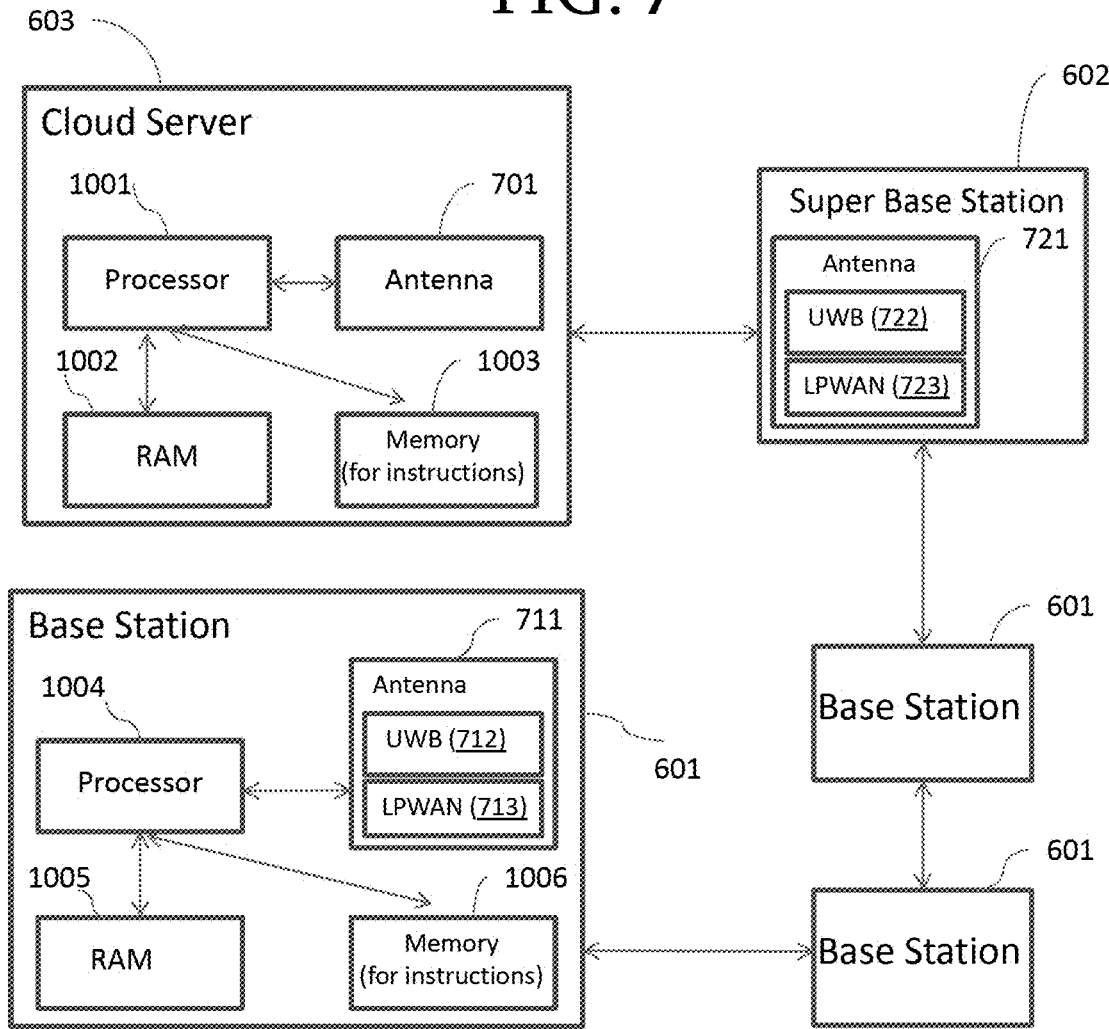
FIG. 7 is a diagram of the system of claim 17 for failure detection of a wireless base station in an optimal transmission sequence. The components of a cloud server are shown, comprising a processor, an antenna, a RAM component, and a memory component. The component of a base station are shown, comprising a processor, an antenna, a RAM component, and a memory component. The components of the antenna of the base station are shown, comprising an ultra-wideband antenna and an LPWAN antenna. The components of a super base station are shown, comprising an antenna. The components of the antenna in the super base station are shown, comprising an ultra-wideband antenna and an LPWAN antenna. Multiple base station nodes are shown to express the plurality of base stations in an optimal transmission sequence.

Referring to FIG. 7, the present invention features a system for failure detection of a wireless base station 601 in an optimal transmission sequence, wherein a successor of a last base station 601 in the optimal transmission sequence is a server 603. In some embodiments, the system may comprise a server 603. The server 603 may comprise a first processor 1001 capable of executing computer-executable instructions, a first antenna 701, a first RAM component 1002, and a first memory component 1003. The memory 1003 may comprise instructions for receiving 305 the combined packet, determining 306 a number of functional base stations in the optimal transmission sequence using a payload size of the combined packet, and identifying 307 zero or more nonfunctional base stations in the optimal transmission sequence using Sequential Interruption Logic based on the number of functional base stations in the optimal transmission sequence.

In some embodiments, the system may also comprise a plurality of base stations. Each base station 601 of the zero, one or plurality of base stations may comprise a second processor 1004 capable of executing computer-executable instructions, a second antenna 711, a second RAM component 1005, and a second memory component 1006. The memory 1006 may comprise instructions for generating 301 a packet, transmitting 302 the packet to its successor in the optimal transmission sequence, combining 303 the received packet with its own generated packet, and transmitting 304 the combined packet to its own successor in the optimal transmission sequence if the packet from a predecessor in the optimal transmission sequence has been received or when a time to receive the packet from the predecessor has lapsed. The instructions may also comprise the repetition 305 of packet combination and transmission to the successor recursively until the server 603 receives the combined packet. In some embodiments, the system may also comprise a plurality of super base stations, wherein each super base station 602 of the plurality of super base stations may comprise a third antenna 721.

In some embodiments, a network topography of the optimal transmission sequence generated by the server 603 is a linear daisy chain. The antenna 721 of a super base station 602 in the plurality of super base stations may comprise an ultra-wideband antenna 722 for set-up & maintenance and an LPWAN antenna 723 for data. The antenna 711 of a base station 601 in the plurality of base stations may further comprise an ultra-wideband antenna 712 for set-up & maintenance and an LPWAN antenna 713 for data. The server 603 may be a local server or a cloud server.

The preceding description sets forth numerous specific details (e.g., specific configurations, parameters, examples, etc.) of the disclosed embodiments, examples of which are illustrated in the accompanying drawings. It should be recognized, however, that such description is not intended as a limitation on the scope of the disclosed embodiments, but is intended to elaborate upon the description of these embodiments. It will be evident to a person of ordinary skill in the art that the present invention can be practiced without every specific detail described infra. Moreover, well-known methods, procedures, components, and circuits have not been described in detail so as not to unnecessarily obscure aspects of the embodiments of the present invention.

It is fully contemplated that the features, components, and/or steps described with respect to one embodiment may be combined with the features, components, and/or steps described with respect to other embodiments of the present disclosure. To avoid needless descriptive repetition, one or more components or actions described in accordance with one exemplary embodiment can be used or omitted as applicable from other embodiments. For the sake of brevity, the numerous iterations of these combinations were not described separately. The same reference numbers may have been used to refer to the same or similar elements in different drawings. Alternately, different reference numbers may be used to refer to the same or similar elements in the drawings of different embodiments. Any distinction of an element's reference number in one embodiment from another is not limiting in any way, does not suggest that elements of one embodiment could not be combined with or substituted for elements in another embodiment, and (most importantly) is specifically intended only to facilitate the matching of elements in the disclosure to their corresponding claim recitations.

What is claimed is:

1. A method (100) for optimization of a network of base stations, the method comprising:
   A. measuring (101), by each base station (601) of zero, one or a plurality of base stations, an RF link attenuation measurement;
   B. determining (102), by a server (603), based on the RF link attenuation measurement, an optimal transmission sequence of base stations from a most distant base station (601) to a super base station (602), wherein full network information is stored in the server (603);

C. designating (103), by the super base station (602), a predecessor and a successor for each base station (601) in the optimal transmission sequence;

D. generating (104), by each base station (601) of the optimal transmission sequence, a packet;

E. transmitting (105), by the most distant base station (601) of the optimal transmission sequence, its generated packet to its successor;

F. transmitting (106), by the successor, if a packet from its predecessor has been received, a combined packet comprising its own generated packet and the packet received from its predecessor;

G. repeating (107) step F recursively until the super base station (602) receives the combined packet;

H. receiving (108), by the server (603), the combined packet transmitted by the super base station (602);

I. identifying (109), by the server (603), any nonfunctional super base station (602) or any nonfunctional base stations in the optimal transmission sequence; and J. repeating (110) steps A-I until all packets have been received by the server (603).

2. The method of claim 1, wherein a network topography of the optimal transmission sequence is a linear daisy chain.

3. The method of claim 2, wherein a transmission source of the packet is unidentified in order to conserve power.

4. The method of claim 3, wherein an antenna (721) of the super base station (602) comprises an ultra-wideband antenna (722) for set-up & maintenance and a low-power, wide-area network (LPWAN) antenna (723) for data.

5. The method of claim 4, wherein the antenna (711) of the base station (601) further comprises an ultra-wideband antenna (712) for set-up & maintenance and an LPWAN antenna (713) for data.

6. The method of claim 5 further comprising transmitting, by each base station (601) of the plurality of base stations, a serial number to the server (603) only when initializing.

7. The method of claim 1 further comprising transmitting (106), by the successor, when a time to receive the packet from its predecessor has lapsed, a combined packet comprising its own generated packet and the packet received from its predecessor.

8. The method of claim 1, wherein the server (603) is a cloud server or a local server.

9. The method of claim 1, wherein identifying (109), by the server (603), any nonfunctional super base station (602) or any nonfunctional base stations in the optimal transmission sequence uses Sequential Interruption Logic based on a payload size of the packet.

10. The method of claim 1, wherein the RF link attenuation measurement is a received signal strength indicator (RSSI).

11. A method (300) for failure detection of a wireless base station (601) in an optimal transmission sequence, wherein a successor of a last base station (601) in the optimal transmission sequence is a server (603), wherein full network information is stored in the server (603), the method comprising:

A. generating (301), by each base station (601) of the optimal transmission sequence, a packet;

B. transmitting (302), by the most distant base station (601), the packet to its successor in the optimal transmission sequence;

combining (303), by the successor, the received packet with its own generated packet;

D. transmitting (304), by the successor, the combined packet to its own successor in the optimal transmission sequence if the packet from a predecessor in the optimal transmission sequence has been received;

E. repeating (305) steps C-D recursively until the server (603) receives the combined packet;

F. identifying (307), by the server (603), zero or more nonfunctional base stations in the optimal transmission sequence.

12. The method of claim 11, wherein a network topography of the optimal transmission sequence is a linear daisy chain.

13. The method of claim 12, wherein an antenna (721) of the super base station (602) comprises an ultra-wideband antenna (722) for set-up & maintenance and an LPWAN antenna (723) for data.

14. The method of claim 13, wherein the antenna (711) of the base station (601) further comprises an ultra-wideband antenna (712) for set-up & maintenance and an LPWAN antenna (713) for data.

15. The method of claim 11 further comprising transmitting (106), by the successor, when a time to receive the packet from its predecessor has lapsed, a combined packet comprising its own generated packet and the packet received from its predecessor.

16. The method of claim 11, wherein the server (603) is a cloud server or a local server.

17. The method of claim 11 further comprising determining (306), by the server (603), a number of functional base stations in the optimal transmission sequence.

18. The method of claim 17, wherein identifying (109), by the server (603), zero or more nonfunctional base stations in the optimal transmission sequence uses Sequential Interruption Logic based on a payload size of the packet or a number of function base stations in the optimal transmission sequence.

19. A system for optimization of a network of base stations, the system comprising:

A. a server (603), comprising:
  i. a first processor (1001) capable of executing computer-executable instructions,
  ii. a first antenna (701),
  iii. a first randomly-accessed memory RAM component (1002), and
  iv. a first memory component (1003), wherein the memory comprises instructions for:
    a. determining (102) based on an RF link attenuation measurement an optimal transmission sequence of base stations from a most distant base station (601) to a super base station (602), wherein full network information is stored in the server (603),
    b. receiving (108) the combined packet transmitted by the super base station (602),
    c. identifying (109) any nonfunctional super base station (602) or any nonfunctional base stations in the optimal transmission sequence, and
    d. receiving (110) a packet;

B. a plurality of base stations, wherein each base station (601) of the plurality of base stations comprises:
  i. a second processor (1004) capable of executing computer-executable instructions,
  ii. a second antenna (711),
  iii. a second RAM component (1005), and
  iv. a second memory component (1006), wherein the memory comprises instructions for:
    a. measuring (101) the RF link attenuation measurement,
    b. generating (104) a packet, c. transmitting (105) its generated packet to its successor, and
d. transmitting (106), if a packet from its predecessor has been received, a combined packet comprising its own generated packet and the packet received from its predecessor,
e. repeating (107) step d recursively until the super base station (602) receives the combined packet; and C. a plurality of super base stations, wherein each super base station (602) of the plurality of super base stations comprises:
i. a third processor (1007) capable of executing computer-executable instructions,
ii. a third antenna (721),
iii. a third RAM component (1008), and
iv. a third memory component (1009), wherein the memory comprises instructions for:
a. designating (103) a predecessor and a successor for each base station (601) in the optimal transmission sequence,
b. receiving (107) the combined packet, and
c. transmitting (108) the combined packet to the server (603).

20. The system of claim 19, wherein a network topography of the optimal transmission sequence is a linear daisy chain.

21. The system of claim 20, wherein a transmission source of the packet is unidentified in order to conserve power.

22. The system of claim 21, wherein the antenna (721) of the super base station (602) comprises an ultra-wideband antenna (722) for set-up & maintenance and an LPWAN antenna (723) for data.

23. The system of claim 22, wherein the antenna (711) of the base station (601) further comprises an ultra-wideband antenna (712) for set-up & maintenance and an LPWAN antenna (713) for data.

24. The system of claim 23 further comprising transmitting, by each base station (601) of the plurality of base stations, a serial number to the server (603) only when initializing.

25. The system of claim 19, wherein the second memory component (1006) further comprises instructions for transmitting (106), by the successor, when a time to receive the packet from its predecessor has lapsed, a combined packet comprising its own generated packet and the packet received from its predecessor.

26. The system of claim 19, wherein the server (603) is a cloud server or a local server.

27. The system of claim 19, wherein identifying (109), by the server (603), any nonfunctional super base station (602) or any nonfunctional base stations in the optimal transmission sequence uses Sequential Interruption Logic based on a payload size of the packet.

28. The system of claim 19, wherein the RF link attenuation measurement is a received signal strength indicator (RSSI).

29. A system for failure detection of a wireless base station (601) in an optimal transmission sequence, wherein a successor of a last base station (601) in the optimal transmission sequence is a server (603), wherein full network information is stored in the server (603), the system comprising:

A. the server (603), comprising:
i. a first processor (1001) capable of executing computer-executable instructions,
ii. a first antenna (701),
iii. a first RAM component (1002), and
iv. a first memory component (1003), wherein the first memory comprises instructions for:
a. receiving (305) the combined packet,
b. determining (306) a number of functional base stations in the optimal transmission sequence, and
c. identifying (307) zero or more nonfunctional base stations in the optimal transmission sequence; and B. a plurality of base stations, wherein each base station (601) of a plurality of base stations comprises:
i. a second processor (1004) capable of executing computer-executable instructions,
ii. a second antenna (711),
iii. a second RAM component (1005), and
iv. a second memory component (1006), wherein the second memory comprises instructions for:
a. generating (301) a packet,
b. transmitting (302) the packet to its successor in the optimal transmission sequence,
c. combining (303) the received packet with its own generated packet,
d. transmitting (304) the combined packet to its own successor in the optimal transmission sequence if the packet from a predecessor in the optimal transmission sequence has been received, and
e. repeating (305) steps c-d recursively until the server (603) receives the combined packet.

30. The system of claim 29, wherein a network topography of the optimal transmission sequence is a linear daisy chain.

31. The system of claim 30, wherein the antenna (721) of the super base station (602) further comprises an ultra-wideband antenna (722) for set-up & maintenance and an LPWAN antenna (723) for data.

32. The system of claim 31, wherein the antenna (711) of the base station (601) further comprises an ultra-wideband antenna (712) for set-up & maintenance and an LPWAN antenna (713) for data.

33. The system of claim 29, wherein the first memory component (1003) further comprises instructions for determining (306) a number of functional base stations in the optimal transmission sequence using a payload size of the combined packet.

34. The system of claim 29, wherein identifying (109), by the server (603), any nonfunctional super base station (602) or any nonfunctional base stations in the optimal transmission sequence uses Sequential Interruption Logic based on a payload size of the packet.

35. The system of claim 29, wherein the second memory component (1006) further comprises instructions for transmitting (106), by the successor, when a time to receive the packet from its predecessor has lapsed, a combined packet comprising its own generated packet and the packet received from its predecessor.

36. The system of claim 29, wherein the server (603) is a cloud server or a local server.

* * * * *